(12) United States Patent
Tanaka et al.

(10) Patent No.: US 8,570,895 B2
(45) Date of Patent: Oct. 29, 2013

(54) COMMUNICATION APPARATUS, COMMUNICATION SYSTEM, COMMUNICATION METHOD, PROGRAM, AND INTEGRATED CIRCUIT

(75) Inventors: Osamu Tanaka, Osaka (JP); Nobuhiko Arashin, Osaka (JP); Toyoshi Yamada, Osaka (JP); Hiroyuki Yurugi, Osaka (JP); Masahiko Nagoshi, Osaka (JP); Akihiko Shiotsuki, Osaka (JP)

(73) Assignee: Panasonic Corporation, Osaka (JP)

( * ) Notice: Subject to any disclaimer, the term of this patent is extended or adjusted under 35 U.S.C. 154(b) by 204 days.

(21) Appl. No.: 13/143,406

(22) PCT Filed: Dec. 10, 2009

(86) PCT No.: PCT/JP2009/006762
§ 371 (c)(1),
(2), (4) Date: Jul. 6, 2011

(87) PCT Pub. No.: WO2010/079553
PCT Pub. Date: Jul. 15, 2010

(65) Prior Publication Data
US 2011/0267975 A1 Nov. 3, 2011

(30) Foreign Application Priority Data
Jan. 8, 2009 (JP) ................................ 2009-002334

(51) Int. Cl.
*H04L 12/26* (2006.01)
(52) U.S. Cl.
USPC .......................................... 370/252; 370/315
(58) Field of Classification Search
USPC ....................................................... 370/252
See application file for complete search history.

(56) References Cited

U.S. PATENT DOCUMENTS

| 5,768,531 A | 6/1998 | Lin |
| 2003/0156558 A1 | 8/2003 | Cromer et al. |
| 2006/0062190 A1 | 3/2006 | Suga |

(Continued)

FOREIGN PATENT DOCUMENTS

| JP | 2005-286751 | 10/2005 |
| JP | 2006-086936 | 3/2006 |
| JP | 2008-085517 | 4/2008 |

OTHER PUBLICATIONS

International Search Report issued Mar. 2, 2010 in International (PCT) Application No. PCT/JP2009/006762.

*Primary Examiner* — Huy D Vu
*Assistant Examiner* — Kevin Cunningham
(74) *Attorney, Agent, or Firm* — Wenderoth, Lind & Ponack, L.L.P.

(57) ABSTRACT

A communication apparatus (10) includes: a measurement data transmitting unit (120) which transmits a first measurement data to a relay apparatus (20), and a second measurement data to a partner apparatus (30); a response data receiving unit (130) which receives first and second response data; a network measurement unit (140) which calculates a first communication time using the first response data, and a second communication time using the second response data; a connection mode judging unit (150) which judges, based on a partner section communication time that is difference between the second and the first communication times, whether or not the relay apparatus (20) and the partner apparatus (30) are wirelessly connected; and a connection mode switching unit (160) which switches, when judged that the relay apparatus (20) and the partner apparatus (30) are wirelessly connected, the communication with the partner apparatus (30) from indirect to direct wireless communication.

6 Claims, 6 Drawing Sheets

(56) References Cited

U.S. PATENT DOCUMENTS

2007/0115842 A1* 5/2007 Matsuda et al. ............. 370/252
2008/0069047 A1* 3/2008 Yee et al. ..................... 370/331
2009/0168736 A1* 7/2009 Itagaki et al. ................ 370/338

* cited by examiner

COMMUNICATION APPARATUS, COMMUNICATION SYSTEM, COMMUNICATION METHOD, PROGRAM, AND INTEGRATED CIRCUIT

TECHNICAL FIELD

The present invention relates to a method of controlling direct link communication in a wireless section. Particularly, the present invention relates to a direct link communication control method which judges whether or not it is necessary to execute a direct link between the communication apparatuses.

BACKGROUND ART

Along with the spread of data communication via network such as the Internet or a LAN, home networking which achieves inter-device communication by connecting home electrical appliances, computers, and other peripheral apparatuses through a network has been widely used in homes. The home networking enables content transmission and reception between apparatuses connecting to the network, and provides users with convenience and comfort.

Furthermore, to connect apparatuses one another, networking apparatuses which include a function that enables connection through wireless communication is expected to become increasingly widespread in the future, from a view point that networking apparatuses have high installation flexibility and can eliminate wiring between apparatuses.

For example, an apparatus which includes a receiving unit such as a TV tuner and a storing unit such as a hard disk can be installed in a home as a server apparatus. Then, contents such as a movie held in the server apparatus is transmitted to a client apparatus such as a digital TV and a PC via a home network. With this, the client apparatus can reproduce the contents while receiving data, and thus so-called content data stream distribution and reproduction processing is performed.

In the case of content data stream distribution between the server apparatus and the client apparatus that are connected through wireless connection, lack of communication bandwidth occurs due to characteristics of the wireless communication, when a distance between devices is long or depending on the environment where the device is installed. Consequently, a problem such as delay in streaming data distribution occurs.

To address this problem, for example, Patent Literature (PTL) 1 proposes a method for judging whether or not a wireless section exists between the server apparatus and the client apparatus, and transmitting data efficiently adapted for the wireless section.

FIG. 6 is a functional block diagram showing a transmitting apparatus included in a communication control apparatus according to a conventional example of the present invention. The transmitting apparatus shown in FIG. 6 calculates bandwidth using two packets having mutually different length. Specifically, the transmitting apparatus includes: a network bandwidth calculation unit 401 which calculates a network bandwidth by dividing a total amount of data, which is received by a receiving side, by the time taken for the reception; and a wireless section estimation unit 402 which estimates whether or not a wireless section as a wireless transmission path exists in a network through which data is to be transmitted, by comparing a network bandwidth at the time of a first packet size and a network bandwidth at the time of a second packet size that have been calculated by the network bandwidth calculation unit 401.

That is, in the case of a wireless LAN compliant with IEEE 802.11, a transmission waiting time and an ACK for delivery confirmation are added to each of data packets to be transmitted. Accordingly, for example, when it is assumed that 1500-byte data is transmitted, there is a large difference in throughout when five packets each containing a 300-byte are transmitted, compared to a case where one packet containing a 1500-byte is transmitted. This is because the transmission waiting time takes five times as long and waiting time for ACK response takes five times as long. Due to this, when the difference in the network bandwidths calculated using the packets of two different sizes is equal to or larger than a predetermined threshold value, it is possible to judge that there is a wireless section.

When a wired LAN is used, the transmission waiting time is significantly short compared to the transmission waiting time of the wireless LAN. Also, there is no ACK response for delivery confirmation. Thus, when the difference in packet size is as much as about the difference between the 300-byte and the 1500-byte, a large difference in a communication time that is observed when the wireless LAN is used is not observed. In other words, a decrease in transmission throughput does not occur. Thus, taking advantage of the above described characteristics, it is possible to estimate that there is a wireless section in a certain section of a network through which data is to be transmitted, when a difference between the network bandwidth measured with the packet containing 1500-byte and a network bandwidth measured with the packets each containing 300-byte is, for example, 50% or more of the network bandwidth measured with a packet containing 1500-byte.

Estimation of the wireless section as described above allows efficient data transmission adapted for wireless sections. For example, data to be transmitted is coded such that the data has error tolerance, or, a plurality of frame data to be transmitted is packetized into one packet.

CITATION LIST

Patent Literature

[PTL 1]
Japanese Unexamined Patent Application No. 2005-286751

SUMMARY OF INVENTION

Technical Problem

It is possible to improve the deteriorated performance relating to the streaming data distribution of video contents by judging that there is a wireless section between the server apparatus and the client apparatus in the home network, and transmitting data efficiently adapted for a wireless section as described above.

However, the above described conventional method can only estimate the connection state of two apparatuses that are directly connected to each other. In other words, when a transmitting apparatus and a receiving apparatus are connected via a relay apparatus such as a router, the transmitting apparatus can estimate the connection state between the transmitting apparatus and the relay apparatus through, the transmitting apparatus cannot recognize the connection state between the relay apparatus and the receiving apparatus.

The present invention is conceived in view of the above-mentioned problem, and has an object of providing a communication apparatus, a communication system, and a communication method which can recognize a connection state of a partner apparatus and select an appropriate connection mode, when the transmitting apparatus is communicating with a partner apparatus that is connected to a relay apparatus. The present invention has another object of providing a program and an integrated circuit which can implement the apparatus, the system and the method described above.

Solution to Problem

A communication apparatus according to an aspect of the present invention is a communication apparatus which is connected through wireless connection to a relay apparatus that relays data, and communicates with a partner apparatus connected to the relay apparatus. More specifically, the communication apparatus includes: a measurement data transmitting unit configured to transmit (i) first measurement data to the relay apparatus, and (ii) second measurement data to the partner apparatus via the relay apparatus, the first measurement data being data for measuring a communication time between the communication apparatus and the relay apparatus, and the second measurement data being data for measuring a communication time between the communication apparatus and the partner apparatus via the relay apparatus; a response data receiving unit configured to (i) receive, from the relay apparatus, first response data that is a response to the first measurement data, and (ii) receive, from the partner apparatus via the relay apparatus, second response data that is a response to the second measurement data; a network measurement unit configured to (i) calculate, based on the first response data, a first communication time that is a communication time between the communication apparatus and the relay apparatus, and (ii) calculate, based on the second response data, a second communication time that is a communication time between the communication apparatus and the partner apparatus via the relay apparatus; a connection mode judging unit configured to judge whether or not the relay apparatus and the partner apparatus are connected through wireless connection, based on a partner section communication time that is a difference between the second communication time and the first communication time; and a connection mode switching unit configured to switch, when the connection mode judging unit judges that the relay apparatus and the partner apparatus are connected through wireless connection, the communication with the partner apparatus from indirect wireless communication to direct wireless communication, the indirect wireless communication being wireless communication via the relay apparatus, and the direct wireless communication being wireless communication not via the relay apparatus.

With the communication apparatus having the above structure, it is possible to judge the connection mode of the partner section (between the relay apparatus and the partner apparatus) by measuring the first communication time, which is a communication time between the communication apparatus and the relay apparatus, and the second communication time, which is a communication time between the communication apparatus and the partner apparatus via the relay apparatus. As a result, it is possible to provide the communication apparatus which can appropriately select a communication mode (indirect wireless communication or direct wireless communication) for communication with the partner apparatus by recognizing the connection mode (wired or wireless) of the partner section.

Furthermore, the connection mode judging unit may be configured to judge that the relay apparatus and the partner apparatus are connected through wireless connection, when the partner section communication time is 50% or more of the first communication time. When the communication apparatus and the relay apparatus are connected through wireless connection, and the relay apparatus and the destination apparatus are also connected through wireless connection, in theory, the communication time between the communication apparatus and the relay apparatus, and the communication time between the relay apparatus and the destination apparatus are equivalent (destination section communication time ≈ first communication time). However, the communication time of the wireless communication varies depending on a distance between the apparatuses or a location of installation. Thus, it is preferable to adopt the above described threshold value.

In addition, the connection mode judging unit is configured to hold, in advance, an assumed communication time that is a partner section communication time assumed when the relay apparatus and the partner apparatus are connected through wired connection. When the partner section communication time falls outside the assumed communication time, the connection mode judging unit may judge that the relay apparatus and the partner apparatus are connected through wireless connection. The communication time is more stable in the wired communication than in wireless communication. Thus, the communication time in wired communication can be assumed in advance. Then, as described above, it may be judged that the partner section is connected through wireless connection, when the partner section communication time does not fall within the assumed communication time that is assumed in advance.

Furthermore, the measurement data transmitting unit may be configured to sequentially transmit (i) a plurality of measurement packets which are included in the first measurement data, and (ii) a plurality of measurement packets which are included in the second measurement data. On the other hand, the response data receiving unit may be configured to sequentially receive (i) a plurality of response packets which are included in the first response data, and (ii) a plurality of response packets which are included in the second response data. When the measurement data and response data are transmitted and received after being divided into a plurality of packets, an overhead that is particular to the wireless communication (a header, a transmission waiting time, ACK and the like) becomes more apparent. As a result, the connection mode can be judged more accurately.

A communication system according to an another aspect of the present invention is a system includes: a relay apparatus that relays data; a partner apparatus connected to the relay apparatus; and a communication apparatus that is connected through wireless connection to the relay apparatus and communicates with the partner apparatus. The communication apparatus includes: a measurement data transmitting unit configured to transmit (i) a first measurement data to the relay apparatus, and (ii) a second measurement data to the partner apparatus via the relay apparatus, the first measurement data being data for measuring a communication time between the communication apparatus and the relay apparatus, and the second measurement data being data for measuring a communication time between the communication apparatus and the partner apparatus via the relay apparatus; a response data receiving unit configured to (i) receive, from the relay apparatus, first response data that is a response to the first measurement data, and (ii) receive, from the partner apparatus via the relay apparatus, second response data that is a response to the second measurement data; a network measurement unit configured to (i) calculate, based on the first response data, a first communication time that is a communication time between the communication apparatus and the relay apparatus, and (ii) calculate, based on the second response data, a second communication time that is a communication time between the communication apparatus and the partner apparatus via the relay apparatus; a connection mode judging unit configured to judge whether or not the relay apparatus and the partner apparatus are connected through wireless connection, based on a partner section communication time that is a difference between the second communication time and the first communication time; and a connection mode switching unit configured to switch, when the connection mode judging unit judges that the relay apparatus and the partner apparatus are connected through wireless connection, the communication with the partner apparatus from indirect wireless communication to direct wireless communication, indirect wireless communication being wireless communication via the relay apparatus, and the direct- wireless communication being wireless communication not via the relay apparatus. The relay apparatus includes: a data transmitting and receiving unit configured to generate the first response data based on the first measurement data, and to transmit the generated first response data to the communication apparatus; and a data relay unit configured to relay the second measurement data received from the communication apparatus to the partner apparatus, and to relay the second response data received from the partner apparatus to the communication apparatus. The partner apparatus includes a data transmitting and receiving unit configured to generate the second response data based on the second measurement data, and to transmit the generated second response data to the communication apparatus via the relay apparatus, the second measurement data being received from the partner apparatus via the relay apparatus.

A communication method according to yet another aspect of the present invention is a method for causing a communication apparatus to switch between connection modes for communication with a partner apparatus, the communication apparatus being connected through wireless connection to a relay apparatus that relays data and communicating with the partner apparatus that is connected to the relay apparatus. More specifically, the communication method includes: transmitting (i) first measurement data to the relay apparatus, and (ii) second measurement data to the partner apparatus via the relay apparatus, the first measurement data being data for measuring a communication time between the communication apparatus and the relay apparatus, and the second measurement data being data for measuring a communication time between the communication apparatus and the partner apparatus via the relay apparatus; (i) receiving, from the relay apparatus, first response data that is a response to the first measurement data, and (ii) receiving, from the partner apparatus via the relay apparatus, second response data that is a response to the second measurement data; calculating (i) a first communication time based on the first response data, and (ii) a second communication time based on the second response data, the first communication time being a communication time between the communication apparatus and the relay apparatus, and the second communication time being a communication time between the communication apparatus and the partner apparatus via the relay apparatus; judging whether or not the relay apparatus and the partner apparatus are connected through wireless connection, based on a partner section communication time that is a difference between the second communication time and the first communication time; and switching, when it is judged in the judging that the relay apparatus and the partner apparatus are connected through wireless connection, the communication with the partner apparatus from indirect wireless communication to direct wireless communication, the indirect wireless communication being wireless communication via the relay apparatus, and the direct wireless communication being wireless communication not via the relay apparatus.

A program according to yet another aspect of the present invention causes a communication apparatus to switch between connection modes for communication with a partner apparatus, the communication apparatus being connected through wireless connection to a relay apparatus that relays data and communicating with the partner apparatus that is connected to the relay apparatus. More specifically, the program causes the communication apparatus to execute: transmitting (i) a first measurement data to the relay apparatus, and (ii) a second measurement data to the partner apparatus via the relay apparatus, the first measurement data being data for measuring a communication time between the communication apparatus and the relay apparatus, and the second measurement data being data for measuring a communication time between the communication apparatus and the partner apparatus via the relay apparatus; (i) receiving, from the relay apparatus, first response data that is a response to the first measurement data, and (ii) receiving, from the partner apparatus via the relay apparatus, second response data that is a response to the second measurement data; calculating (i) a first communication time based on the first response data, and (ii) a second communication time based on the second response data, the first communication time being a communication time between the communication apparatus and the relay apparatus, and the second communication time being a communication time between the communication apparatus and the partner apparatus via the relay apparatus; judging whether or not the relay apparatus and the partner apparatus are connected through wireless connection, based on a partner section communication time that is a difference between the second communication time and the first communication time; and switching, when it is judged in the judging that the relay apparatus and the partner apparatus are connected through wireless connection, the communication with the partner apparatus from indirect wireless communication to direct wireless communication, the indirect wireless communication being wireless communication via the relay apparatus, and the direct wireless communication being wireless communication not via the relay apparatus.

An integrated circuit according to yet another aspect of the present invention is an integrated circuit for causing a communication apparatus to switch between connection modes for communication with a partner apparatus, the communication apparatus being connected through wireless connection to a relay apparatus that relays data and communicating with the partner apparatus that is connected to the relay apparatus. More specifically, the integrated circuit includes: a measurement data transmitting unit configured to transmit (i) a first measurement data to the relay apparatus, and (ii) a second measurement data to the partner apparatus via the relay apparatus, the first measurement data being data for measuring a communication time between the communication apparatus and the relay apparatus, and the second measurement data being data for measuring a communication time between the communication apparatus and the partner apparatus via the relay apparatus; a response data receiving unit configured to (i) receive, from the relay apparatus, first response data that is a response to the first measurement data, and (ii) receive, from the partner apparatus via the relay apparatus, second response data that is a response to the second measurement data; a network measurement unit configured to (i) calculate, based on the first response data, a first communication time that is a communication time between the communication apparatus and the relay apparatus, and (ii) calculate, based on the second response data, a second communication time that is a communication time between the communication apparatus and the partner apparatus via the relay apparatus; a connection mode judging unit configured to judge whether or not the relay apparatus and the partner apparatus are connected through wireless connection, based on a partner section communication time that is a difference between the second communication time and the first communication time; and a connection mode switching unit configured to switch, when the connection mode judging unit judges that the relay apparatus and the partner apparatus are connected through wireless connection, the communication with the partner apparatus from indirect wireless communication to direct wireless communication, the indirect wireless communication being wireless communication via the relay apparatus, and the direct wireless communication being wireless communication not via the relay apparatus.

It is to be noted that the present invention may be realized not only as the communication apparatus but also as an integrated circuit which achieves functions of the communication apparatus, and as a program which causes a computer to perform such functions. And it goes without saying that such a program can be distributed through recording media such as a CD-ROM and transmission media such as the Internet.

Advantageous Effects of Invention

With the communication apparatus having the above structure, it is possible to judge the connection mode of the partner section (between the relay apparatus and the partner apparatus) by measuring the first communication time, which is a communication time between the communication apparatus and the relay apparatus, and the second communication time, which is a communication time between the communication apparatus and the partner apparatus via the relay apparatus. As a result, it is possible to provide the communication apparatus which can appropriately select a communication mode (indirect wireless communication or direct wireless communication) for communication with the partner apparatus by recognizing the connection mode (wired or wireless) of the partner section.

DESCRIPTION OF EMBODIMENT

Figure 1:
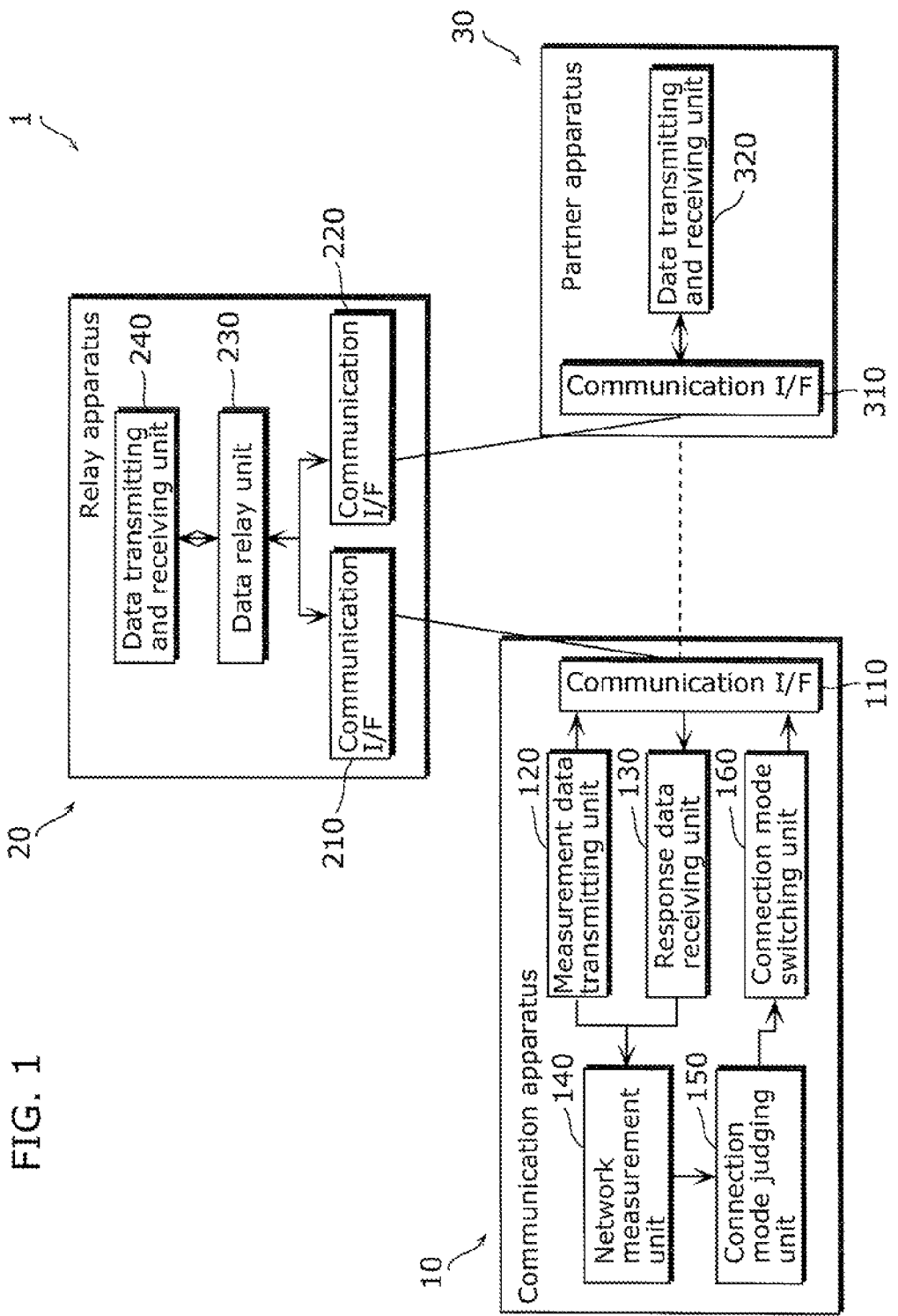
FIG. 1 is a diagram showing a system structure and a functional block of each of components of a communication system according to an embodiment of the present invention.

FIG. 1 is a diagram showing a system structure of a communication system 1 according to an embodiment of the present invention. The communication system 1 includes: a communication apparatus 10 according to an embodiment of the present invention; a relay apparatus 20 that relays data; and a partner apparatus 30 that communicates with the communication apparatus 10 via the relay apparatus 20. It is to be noted that the communication apparatus 10 and the relay apparatus 20 are connected through wireless connection. On the other hand, the relay apparatus 20 and the partner apparatus 30 may be connected through wired connection or through wireless connection. Further, it is assumed that the communication apparatus 10 and the relay apparatus 20 are connected directly, that is, there is no device between the communication apparatus 10 and the relay apparatus 20. Also, it is assumed that the relay apparatus 20 and the partner apparatus 30 are connected directly, that is, there is no device between the relay apparatus 20 and the partner apparatus 30.

It is to be noted that a typical example of the relay apparatus 20 is a router. Meanwhile, typical examples of the communication apparatus 10 and the partner apparatus 30 are Personal Computers (PCs). Alternatively, the communication apparatus 10 may also be a DVD recorder or a content server which includes a receiving unit such as a TV tuner and a storing unit such as a hard disk; and the partner apparatus 30 may also be a TV or the like that receives contents from the communication apparatus 10 through a home network and reproduces the received contents.

The communication apparatus 10 includes: a communication InterFace (I/F) 110; a measurement data transmitting unit 120; a response data receiving unit 130; a network measurement unit 140; a connection mode judging unit 150; and a connection mode switching unit 160.

The communication I/F 110 is a wireless communication interface which performs wireless communication in a manner specified by IEEE 802.11, and is connected to the relay apparatus 20 through wireless connection. The communication I/F 110 supports both indirect wireless communication (infrastructure mode) that is wireless communication via the relay apparatus 20, and direct wireless communication (Direct Link Setup) that is wireless communication not via the relay apparatus 20.

The measurement data transmitting unit 120 transmits measurement data for measuring a communication time between the communication apparatus 10 and an other device. The measurement data transmitting unit 120 in this embodiment transmits a first measurement data, which is for measuring a communication time between the communication apparatus 10 and the relay apparatus 20, and a second measurement data, which is for measuring a communication time between the communication apparatus 10 and the partner apparatus 30. Here, "communication time between the communication apparatus 10 and the partner apparatus 30" refers to the time required for communication between the communication apparatus 10 and the partner apparatus 30 via the relay apparatus 20. In other words, the second measurement data is delivered to the partner apparatus 30 via the relay apparatus 20.

It is to be noted that, for the measurement of a communication time, "PING command" or the like can be used. Specifically, the communication time can be measured by inputting, in a command interface, "ping −1 measurement_data_size_address_of_target_apparatus".

That is, the measurement data is an "echo request" specified by Internet Control Message Protocol (ICMP). Likewise, response data is an "echo reply".

The response data receiving unit 130 receives, from the relay apparatus 20, first response data, which is a response to the first measurement data, and second response data, which is a response to the second measurement data. It is to be noted that the second response data is delivered from the partner apparatus 30 to the communication apparatus 10 via the relay apparatus. 20 in the similar manner as for the second measurement data.

The network measurement unit 140 calculates, from the first response data, a first communication time that is a communication time between the communication apparatus 10 and the relay apparatus 20. In the similar manner, the network measurement unit 140 calculates, from the second response data, a second communication time that is a communication time between the communication apparatus 10 and the partner apparatus 30. Further, the network measurement unit 140 calculates a partner section communication time that is a difference between the second communication time and the first communication time.

The connection mode judging unit 150 judges, based on the partner section communication time, whether the relay apparatus 20 and the partner apparatus 30 are connected through wired connection or through wireless connection. For example, following criteria can be adopted for the judgment. It is possible to judge that the relay apparatus 20 and the partner apparatus 30 are connected through wireless communication when the partner section communication time is the same as or longer than the first communication time, that is, when the communication time between the relay apparatus 20 and the partner apparatus 30 (the partner section communication time) is the same as or longer than the communication time between the communication apparatus 10 and the relay apparatus 20 (the first communication time).

The connection mode switching unit 160 switches, when it is judged by the connection mode judging unit 150 that the relay apparatus 20 and the partner apparatus 30 are connected through wireless connection, the communication with the partner apparatus 30 from indirect wireless communication to direct wireless communication.

Specifically, the connection mode switching unit 160 transmits a request for connection (DLSRequest) to the partner apparatus 30 via the relay apparatus 20. Receiving the DLSRequest, the partner apparatus 30 transmits a response (DLSResponse) to the communication apparatus 10 via the relay apparatus 20, when the partner apparatus 30 itself is equipped with a function for a DLS. This completes the setting for the DLS between the communication apparatus 10 and the partner apparatus 30. When the DLS setting is completed, the communication apparatus 10 and the partner apparatus 30 can communicate data directly (through the path indicated by a broken line in FIG. 1).

It is to be noted that the measurement data transmitting unit 120 according to this embodiment divides the measurement data into a plurality of measurement packets, and sequentially transmits the measurement packets. On the other hand, the response data receiving unit 130 according to this embodiment sequentially receives a plurality of response packets, and obtains response data by combining the response packets. Furthermore, the network measurement unit 140 measures, as the communication time, the time taken from start of transmission of the first measurement packet to the completion of receiving of the last response packet.

The relay apparatus 20 is an apparatus that receives data, and relays the received data according to a destination address. Specifically, the relay apparatus 20 includes communication I/Fs, which are a communication I/F 210 and a communication I/F 220, a data relay unit 230, and a data transmitting and receiving unit 240. The communication I/F 210 is a wireless communication interface which is connected to the communication I/F 110 of the communication apparatus 10. The communication I/F 220 is an interface that is connected to the partner apparatus 30.

A data relay unit 230 relays data based on the destination address that is set in a header of the received data. Specifically, when the address of the relay apparatus 20 itself is set in the data received through the communication I/Fs 210 and 220, the data relay unit 230 notifies the data transmitting and receiving unit 240 of the data. Furthermore, when the data relay unit 230 is notified of data by the data transmitting and receiving unit 240, the data relay unit 230 transmits the notified data through the appropriate communication I/F 210 or 220 based on the destination address. On the other hand, when an address of an other apparatus is set in the data received through the communication I/Fs 210 and 220, the data relay unit 230 transmits the received data through the appropriate communication I/F 210 or 220 without notifying the data transmitting and receiving unit 240.

The data transmitting and receiving unit 240 generates the first response data in response to the first measurement data received from the communication apparatus 10, and transmits the first response data to the communication apparatus 10 through the communication I/F 210.

The partner apparatus 30 includes a communication I/F 310 and a data transmitting and receiving unit 320. The communication I/F 310 is an interface which is connected to the communication I/F 220 of the relay apparatus 20. Connection mode is either wired connection or wireless connection. The data transmitting and receiving unit 320 generates the second response data in response to the second measurement data which is received from the communication apparatus 10 via the relay apparatus 20, and transmits the second response data to the communication apparatus 10 via the relay apparatus 20.

Following describes a flow of the measurement data and the response data according to the communication system 1 having the above described structure.

First, the measurement data transmitting unit 120 in the communication apparatus 10 transmits, to the relay apparatus 20, the first measurement data in which an address of the relay apparatus 20 (communication I/F 210) is set in the destination address field. The data relay unit 230 in the relay apparatus 20 confirms that the address of the relay apparatus 20 itself is set in the destination address field of the first measurement data which is received through the communication I/F 210, and notifies the data transmitting and receiving unit 240. The data transmitting and receiving unit 240 generates the first response data in response to the first measurement data, and transmits the first response data to the communication apparatus 10 through the communication I/F 210 after setting in the destination address field an address of the communication apparatus 10.

Furthermore, the measurement data transmitting unit 120 in the communication apparatus 10 transmits, to the relay apparatus 20, the second measurement data in which an address of the partner apparatus 30 is set in the destination address field. The data relay unit 230 in the relay apparatus 20 confirms that an address of the partner apparatus 30 is set in the destination address field of the second measurement data received through the communication I/F 210, and then transmits the second measurement data to the partner apparatus 30 through the communication I/F 220. The data transmitting and receiving unit 320 in the partner apparatus 30 generates the second response data in response to the received second measurement data, and transmits the second response data to the relay apparatus 20 after storing in the destination address field an address of the communication apparatus 10. The data relay unit 230 in the relay apparatus 20 transmits the second response data, which is received through the communication I/F 220, to the communication apparatus 10 through the communication I/F 210.

Figure 2:
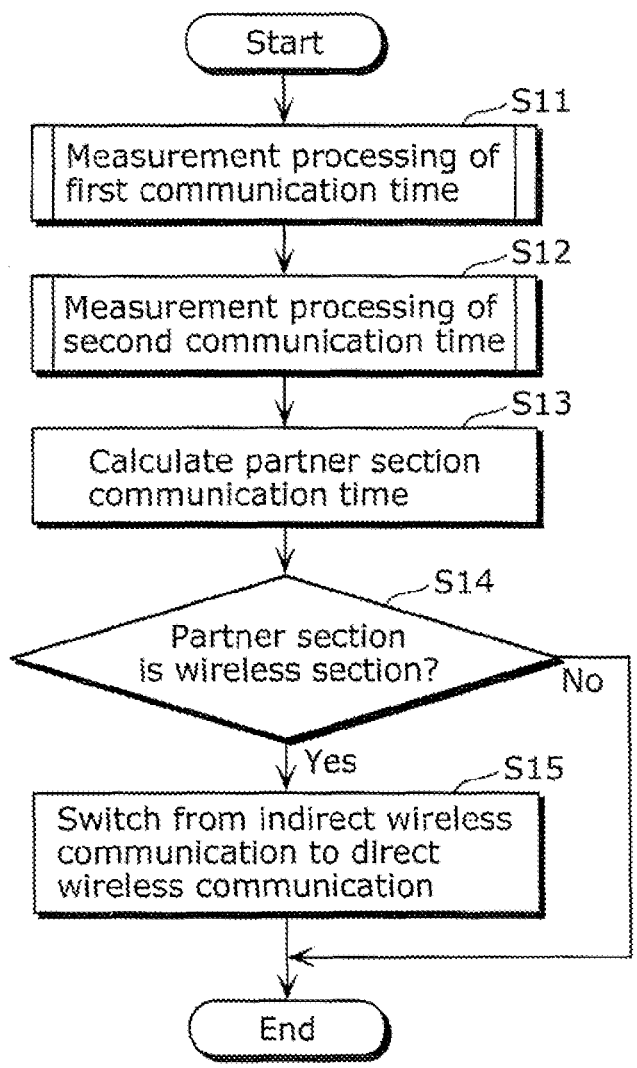
FIG. 2 is a flowchart illustrating an operation performed by a communication apparatus according to an embodiment of the present invention.
Figure 3:
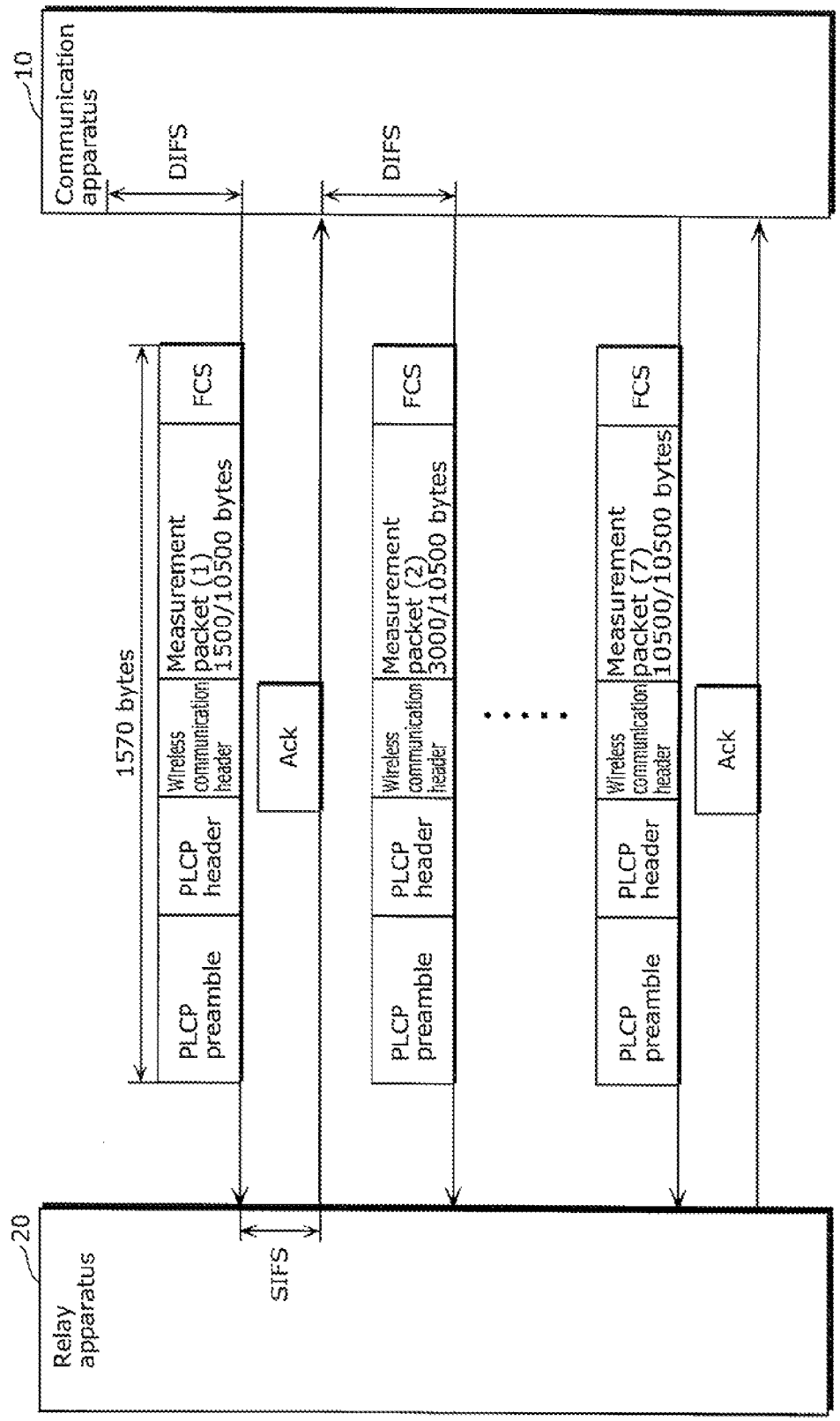
FIG. 3 is a diagram showing a flow of data, when measurement data is transmitted between the communication apparatus and a relay apparatus that are connected through wireless connection.
Figure 4:
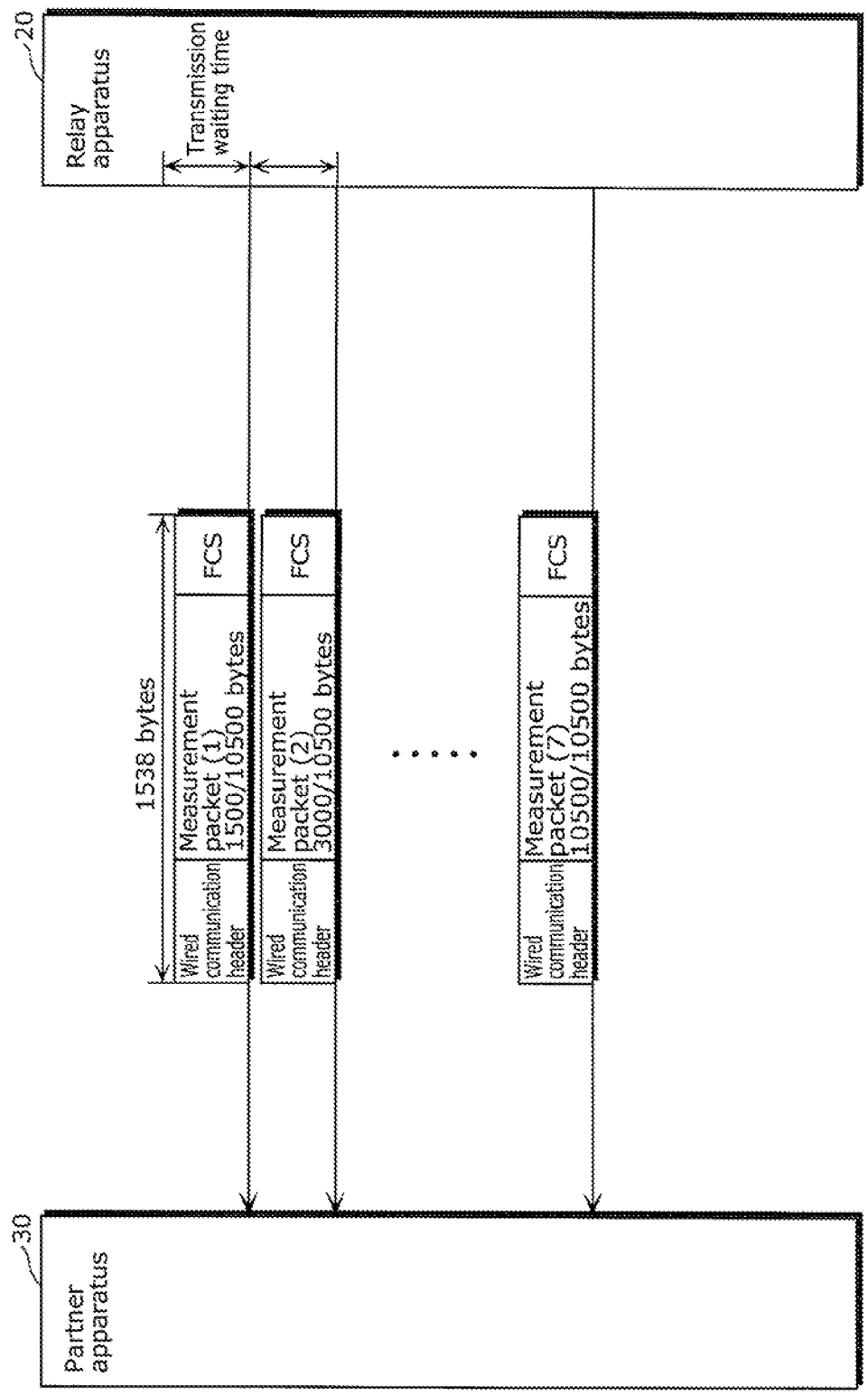
FIG. 4 is a diagram showing a flow of data, when measurement data is transmitted between the relay apparatus and a partner apparatus that are connected through wired connection.

Next, with reference to FIG. 2 to FIG. 4, processing performed by the communication apparatus 10 to judge the connection mode between the relay apparatus 20 and the partner apparatus 30 is described. It is to be noted that FIG. 2 is a flowchart illustrating the operation of the communication apparatus 10. FIG. 3 shows a flow of data, when the measurement data is communicated between the communication apparatus 10 and the relay apparatus 20 that are connected through wireless connection. FIG. 4 is a diagram showing a flow of data, when the measurement data is communicated between the relay apparatus 20 and the partner apparatus 30 that are connected through wired connection.

It is to be noted that the size of the first and the second measurement data according to this embodiment is 10500 bytes. With Ethernet® or a wireless LAN, the measurement data is divided into 1500-byte measurement packets and then transmitted. Thus, it is assumed that seven measurement packets (1500-byte) are communicated in this embodiment. Also note that the size of the measurement data and the response data are the same.

First, the communication apparatus 10 executes measurement processing of a first communication time (S11). In other words, the measurement data transmitting unit 120 transmits the first measurement data to the relay apparatus 20; and the response data receiving unit 130 receives the first response data, which is a response to the first measurement data, from the relay apparatus 20. Then, the network measurement unit 140 calculates the first communication time.

Specifically, the measurement data transmitting unit 120 in the communication apparatus 10 waits for duration of Distributed InterFrame Space (DIFS) as shown in FIG. 3, and then transmits a measurement packet (1) to the relay apparatus 20. On the other hand, the communication I/F 210 in the relay apparatus 20 waits for duration of Short InterFrame Space (SIFS) when the reception of the measurement packet (1) described above is completed, and then transmits, to the communication apparatus 10, an ACKnowledgement (ACK) packet that indicates the completion of reception of the data.

Here, as shown in FIG. 3, the 1500-byte measurement packet (1) is added with 18-byte Physical Layer Convergence Protocol (PLCP) preamble, 4-byte PLCP header, 34-byte wireless communication header, and 4-byte Frame Check Sequence (FCS). This means that the measurement data transmitting unit 120 transmits a total of 1570-byte data.

In other words, when it is assumed that the data transfer rate between the communication apparatus 10 and the relay apparatus 20 is 54 Mega Bits Per Second (Mbps), it takes approximately 222 (μsec) to transmit the 1570-byte data, and it takes approximately 24 (μsec) to transmit the ACK packet. Furthermore, the DIFS is 101.5 (μsec) and the SIFS is 16 (μsec). Accordingly, it takes approximately 363.5 (μsec) from when the communication apparatus 10 starts the transmission of the measurement packet (1) to when the communication apparatus 10 completes the reception of the ACK packet.

In this embodiment, the communication apparatus 10 transmits seven measurement packets (1) to (7) according to the procedure described above. Thus, it takes approximately 2544.5 (μsec) until the relay apparatus 20 completes the reception of the first measurement data. Furthermore, processing of transmitting and receiving of the first response packet is similar to the above. Thus, it takes approximately 5.089 (msec) from when the communication apparatus 10 starts the transmission of the first measurement data to when the communication apparatus 10 completes the reception of the first response data. In other words, the first communication time calculated by the network measurement unit 140 is 5.089 (msec).

Next, the communication apparatus 10 executes measurement processing of the second communication time (S12). In other words, the measurement data transmitting unit 120 transmits the second measurement data to the partner apparatus 30 via the relay apparatus 20. Then, the response data receiving unit 130 receives the second response data, which is a response to the second measurement data, from the partner apparatus 30 via the relay apparatus 20. Then, the network measurement unit 140 calculates the second communication time.

At this time, a time taken to transmit the second measurement data from the communication apparatus 10 to the relay apparatus 20, and a time taken to transmit the second response data from the relay apparatus 20 to the communication apparatus 10 are similar to the above description. Thus, the description thereof is omitted. Furthermore, when the relay apparatus 20 and the partner apparatus 30 are connected through wireless connection, a time taken to transmit the second measurement data from the relay apparatus 20 to the partner apparatus 30, and a time taken to transmit the second response data from the partner apparatus 30 to the relay apparatus 20 are also similar to the above description. In other words, when the relay apparatus 20 and the partner apparatus 30 are connected through wireless connection, the second communication time calculated by the network measurement unit 140 is 10.178 (msec).

On the other hand, when the relay apparatus 20 and the partner apparatus 30 are connected through wired connection, transmitting and receiving of data between the relay apparatus 20 and the partner apparatus 30 are performed in a quite different manner than FIG. 3. Specifically, as shown in FIG. 4, the data relay unit 230 in the relay apparatus 20 waits for a predetermined transmission waiting time, and then transmits the measurement packet (1) to the partner apparatus 30. Here, as shown in FIG. 4, the 1500-byte measurement packet (1) is added with a 34-byte wired communication header, and 4-byte Frame Check Sequence (FCS). Thus, the data relay unit 230 transmits a total of 1538-byte data. When data is transmitted through wired connection, the ACK packet which indicates the completion of the reception of data is not necessary.

To put it differently, when it is assumed that the data transfer rate between the relay apparatus 20 and the partner apparatus 30 is equivalent to the case shown in FIG. 3 (54 Mbps), it takes approximately 217 (μsec) to transmit the 1538-byte data. In addition, when data is transmitted through wired connection, the transmission waiting time is significantly short compared to the transmission time of data. Thus, the transmission waiting time can be ignored. As a result, it takes approximately 1.52 (msec) from when the relay apparatus 20 starts the transmission of the measurement packet (1) to when the partner apparatus 30 completes the reception of the measurement packet (7). Furthermore, it takes an equivalent amount of time as the time described above to transmit the second response data from the partner apparatus 30 to the relay apparatus 20. Thus, it takes approximately 3.04 (msec) from when the relay apparatus 20 starts the transmission of the second measurement data to when the relay apparatus 20 completes the reception of the second response data.

Accordingly, the time required from when the communication apparatus 10 starts the transmission of the second measurement data to when the communication apparatus 10 completes the reception of the second response data is determined as 8.129 (msec) by adding the communication time between the communication apparatus 10 and the relay apparatus 20, which is 5.089 (msec), and the communication time between the relay apparatus 20 and the partner apparatus 30, which is 3.04 (msec). In other words, the second communication time calculated by the network measurement unit 140 is 8.129 (msec).

It is to be noted that the measurement processing of the first communication time (S11) and the measurement processing of the second communication time (S12) may be performed in reverse order or may be performed in parallel.

Next, the network measurement unit 140 in the communication apparatus 10 calculates a partner section communication time based on the first and the second communication time (S13). The partner section communication time refers to a time required for communication between the relay apparatus 20 and the partner apparatus 30, and is obtained by calculating the difference between the second communication time and the first communication time.

In this embodiment, the partner section communication time is, when the relay apparatus 20 and the partner apparatus 30 are connected through wireless connection, 5.089 (msec). On the other hand, when the relay apparatus 20 and the partner apparatus 30 are connected through wired connection, the partner section communication time is 3.04 (msec). However, in practice, a certain amount of time is required for internal processing performed by the relay apparatus 20. Thus, the actual partner section communication time takes about several ($\mu$sec) to several dozen ($\mu$sec) longer than the time described above.

Next, the connection mode judging unit 150 in the communication apparatus 10 judges, based on the partner section communication time, whether or not the partner section, that is, whether or not the relay apparatus 20 and the partner apparatus 30 are connected through wireless connection (S14). Specifically, when the partner section communication time is the same as or longer than the first communication time, the connection mode judging unit 150 judges that the partner section is wireless section (Yes in S14). When the partner section communication time is shorter than the first communication time, the connection mode judging unit 150 judges that the partner section is wired section (No in S14).

When it is judged that the relay apparatus 20 and the partner apparatus 30 are connected through wireless connection (Yes in S14), the connection mode switching unit 160 in the communication apparatus 10 switches the communication with the partner apparatus 30 from indirect wireless communication to direct wireless communication (S15). Specifically, the communication apparatus 10 and the partner apparatus 30 can start the direct wireless communication (direct link communication) by transmitting and receiving a request for connection (DLSRequest) and a response (DLSResponse) via the relay apparatus 20.

On the other hand, when it is judged by the connection mode judging unit 150 that the relay apparatus 20 and the partner apparatus 30 are connected through wired connection (No in S14), the communication method between the apparatus 10 and the partner apparatus 30 is not changed, and data is communicated via the relay apparatus 20.

With the communication apparatus 10 having the above described structure, it is possible to judge the connection mode of the partner section (the section between the relay apparatus 20 and the partner apparatus 30) by measuring the first communication time, which is the communication time between the communication apparatus 10 and the relay apparatus 20, and the second communication time, which is the communication time between the communication apparatus 10 and the partner apparatus 30 via the relay apparatus 20. As a result, it is possible to obtain the communication apparatus 10 which can appropriately select a communication mode (indirect wireless communication or direct wireless communication) to be used between the communication apparatus 10 and the partner apparatus 30 by recognizing the connection mode (wired or wireless) of the partner section.

Furthermore, the first and the second communication time can be measured using a PING command. Thus, it is not necessary to change an existing function of or to add new function to the relay apparatus 20 and the partner apparatus 30. Therefore, the processing described above can be performed without changing an existing system substantially.

Furthermore, compared to the wired communication shown in FIG. 4, the wireless communication shown in FIG. 3 has a larger overhead such as the header that is added to each of packets, the ACK packet for notifying the completion of receiving, and the long transmission waiting time. Thus, difference in a communication time becomes more apparent as the measurement data and response data are transmitted and received after being divided into a plurality of packets. As a result, the connection mode can be judged more accurately.

Further, when apparatuses which support the DLS are connected directly through wireless connection, a load on the relay apparatus 20 is lessened. Thus, communication delay or the like on other apparatuses connected to the relay apparatus 20 can be suppressed. As a result, the communication system 1 which has high throughput can be obtained.

It is to be noted that although, in the example according to an embodiment describe above, it is judged that the partner section is connected through wireless connection when the partner section communication time is the same as or longer than the first communication time, the present invention is not limited to the above, and other judging criteria may be adopted.

For example, a communication time in wireless communication depends on a physical distance between apparatuses. In other words, the above described judging criterion is based on a premise that the distance between the communication apparatus 10 and the relay apparatus 20, and the distance between the relay apparatus 20 and the partner apparatus 30 are equivalent. To put it differently, when the distance between the communication apparatus 10 and the relay apparatus 20 is longer than the distance between the relay apparatus 20 and the partner apparatus 30, there is a possibility that the partner section communication time becomes shorter than the first communication time even when the relay apparatus 20 and the partner apparatus 30 are connected through wireless connection.

Thus, it is preferable to consider the above described matter when setting a threshold of the judging criteria. Specifically, as described later, the partner section communication time is 1.64 msec (approximately 32% of the first communication time) when the relay apparatus 20 and the partner apparatus 30 are connected through wired connection and a data transfer rate is 100 Mbps. Thus, the partner section communication time needs to be 32% or more of the first communication time. In view of this, the connection mode judging unit 150 may judge that the partner section is connected through wireless connection, when the partner section communication time is at least 50% or 60% of the first communication time.

Figure 5:
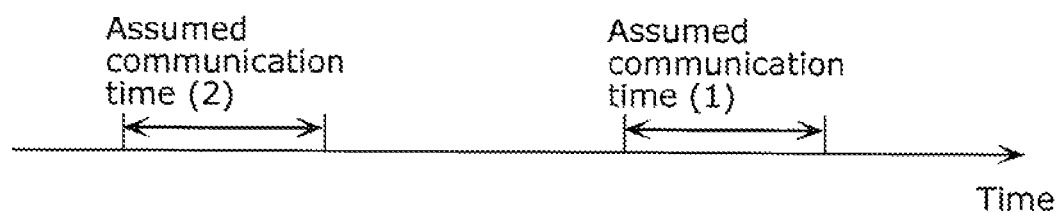
FIG. 5 is a diagram showing an example of a judging criterion for judging a connection mode of a partner section.
Figure 6:
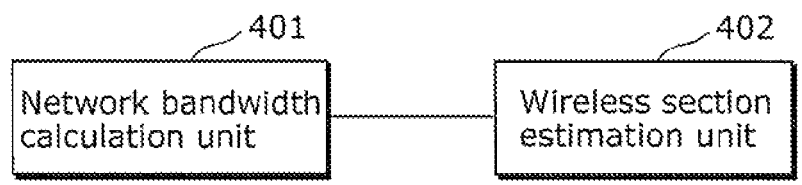
FIG. 6 is a functional block diagram of a conventional communication apparatus.

In addition, as shown in FIG. 5, the connection mode judging unit 150 may hold, in advance, a partner section communication time that is assumed when the relay apparatus 20 and the partner apparatus 30 are connected through wired connection (assumed communication time). Then, the connection mode judging unit 150 may judge that the partner section is connected through wireless connection, when the partner section communication time calculated based on the first and the second communication time falls outside the assumed communication time.

It is to be noted that the communication apparatus 10 does not recognize the data transfer rate between the relay apparatus 20 and the partner apparatus 30, and thus it is preferable that the communication apparatus 10 hold a plurality of assumed communication time corresponding to a plurality of data transfer rates. In addition, although the data transfer rate is more stable in wired communication than in the wireless communication, an error may be included. Thus, it is preferable that the assumed communication time that the communication apparatus 10 holds is a certain time period that includes a logical assumed communication time.

FIG. 5 shows an example where the time required for transmitting and receiving the measurement data and the response data (theoretical values) are held as 1.64 (msec) and 164 (μsec), when it is assumed that the data transfer rate between the relay apparatus 20 and the partner apparatus 30 is 100 Mbps or 1 Gbps. In addition, it is assumed that the error is ±5% of the above described theoretical value.

Accordingly, the assumed communication time (1) is 1.56 (msec) to 1.72 (msec), and the assumed communication time (2) is 156 (μsec) to 172 (μsec). Then, the connection mode judging unit 150 may judge that the partner section is wireless section, when an actually measured partner section communication time does not fall within the range of the assumed communication time (1) or the assumed communication time (2) described above.

It is to be noted that the process in the above embodiment may be implemented by a dedicated H/W (an integrated circuit or the like) and may alternatively be implemented by causing a CPU to perform interpretive execution of predetermined program data with which the above-described processing stored in the storage device (ROM, RAM, hard disk, etc.) can be executed.

Moreover, ways to achieve integration are not limited to the Large Scale Integration (LSI), and special circuit or general purpose processor can also achieve the integration. It is also acceptable to use a Field Programmable Gate Array (FPGA) that is programmable after the LSI has been manufactured, and a reconfigurable processor in which connections and settings of circuit cells within the LSI are reconfigurable.

In addition, the program data may be introduced into the storage device by way of a recording medium and may alternatively be directly executed from the recording medium. The recording medium represents: a semiconductor memory such as a ROM, a RAM, and a flash memory; a magnetic disk memory such as a flexible disk and a hard disk; an optical disc such as a CD-ROM, a DVD, and a BD; a memory card such as an SD card; and the like. In addition, the recording medium includes, as a concept, communication media such as a telephone line and a transmission line.

While the embodiment of the present invention has been described above with reference to the drawings, the present invention is not limited to the illustrated embodiments. Various modifications and variations may be made to the illustrated embodiments within the literal or equivalent scope of the claimed invention.

INDUSTRIAL APPLICABILITY

The direct link communication control method according to the present invention measures, when a transmitting apparatus and a receiving apparatus are connected via a relay apparatus, a network status between the transmitting apparatus and the receiving apparatus and a network status between the transmitting apparatus and the relay apparatus. This produces an advantageous effect of judging whether or not there is a plurality of wireless sections. The direct link communication control method according to the present invention is useful for communication between the transmitting apparatus and the receiving apparatus that perform efficient data transmission through direct communication instead of communication through wireless sections.

Reference Signs List
    1 Communication system
    10 Communication apparatus
    20 Relay apparatus
    30 Partner apparatus
    110, 210, 220, 310 Communication I/F
    120 Measurement data transmitting unit
    130 Response data receiving unit
    140 Network measurement unit
    150 Connection mode judging unit
    160 Connection mode switching unit
    230 Data relay unit
    240, 320 Data transmitting and receiving unit

The invention claimed is:

1. A communication apparatus which is connected through wireless connection to a relay apparatus that relays data, and communicates with a partner apparatus connected to the relay apparatus, said communication apparatus comprising:
   a measurement data transmitting unit configured to transmit (i) first measurement data to the relay apparatus, and (ii) second measurement data to the partner apparatus via the relay apparatus, the first measurement data being data for measuring a communication time between said communication apparatus and the relay apparatus, and the second measurement data being data for measuring a communication time between said communication apparatus and the partner apparatus via the relay apparatus;
   a response data receiving unit configured to (i) receive, from the relay apparatus, first response data that is a response to the first measurement data, and (ii) receive, from the partner apparatus via the relay apparatus, second response data that is a response to the second measurement data;
   a network measurement unit configured to (i) calculate, based on the first response data, a first communication time that is a communication time between said communication apparatus and the relay apparatus, and (ii) calculate, based on the second response data, a second communication time that is a communication time between said communication apparatus and the partner apparatus via the relay apparatus;
   a connection mode judging unit configured to judge whether or not the relay apparatus and the partner apparatus are connected through wireless connection, based on a partner section communication time that is a difference between the second communication time and the first communication time; and a connection mode switching unit configured to switch, when said connection mode judging unit judges that the relay apparatus and the partner apparatus are connected through wireless connection, the communication with the partner apparatus from indirect wireless communication to direct wireless communication, the indirect wireless communication being wireless communication via the relay apparatus, and the direct wireless communication being wireless communication not via the relay apparatus, wherein said connection mode judging unit is configured to judge that the relay apparatus and the partner apparatus are connected through wireless connection, when the partner section communication time is greater than or equal to a predetermined percentage of the first communication time.

2. A communication apparatus which is connected through wireless connection to a relay apparatus that relays data, and communicates with a partner apparatus connected to the relay apparatus, said communication apparatus comprising:

a measurement data transmitting unit configured to transmit (i) first measurement data to the relay apparatus, and (ii) second measurement data to the partner apparatus via the relay apparatus, the first measurement data being data for measuring a communication time between said communication apparatus and the relay apparatus, and the second measurement data being data for measuring a communication time between said communication apparatus and the partner apparatus via the relay apparatus;

a response data receiving unit configured to (i) receive, from the relay apparatus, first response data that is a response to the first measurement data, and (ii) receive, from the partner apparatus via the relay apparatus, second response data that is a response to the second measurement data;

a network measurement unit configured to (i) calculate, based on the first response data, a first communication time that is a communication time between said communication apparatus and the relay apparatus, and (ii) calculate, based on the second response data, a second communication time that is a communication time between said communication apparatus and the partner apparatus via the relay apparatus;

a connection mode judging unit configured to judge whether or not the relay apparatus and the partner apparatus are connected through wireless connection, based on a partner section communication time that is a difference between the second communication time and the first communication time; and a connection mode switching unit configured to switch, when said connection mode judging unit judges that the relay apparatus and the partner apparatus are connected through wireless connection, the communication with the partner apparatus from indirect wireless communication to direct wireless communication, the indirect wireless communication being wireless communication via the relay apparatus, and the direct wireless communication being wireless communication not via the relay apparatus, wherein said connection mode judging unit is configured to (i) hold, in advance, an assumed communication time that is a partner section communication time assumed when the relay apparatus and the partner apparatus are connected through wired connection, and (ii) judge that the relay apparatus and the partner apparatus are connected through wireless connection, when the partner section communication time falls outside the assumed communication time.

3. A communication system comprising: a relay apparatus that relays data; a partner apparatus connected to said relay apparatus; and a communication apparatus that is connected through wireless connection to said relay apparatus and communicates with said partner apparatus, wherein said communication apparatus includes:

a measurement data transmitting unit configured to transmit (i) a first measurement data to said relay apparatus, and (ii) a second measurement data to said partner apparatus via said relay apparatus, the first measurement data being data for measuring a communication time between said communication apparatus and said relay apparatus, and the second measurement data being data for measuring a communication time between said communication apparatus and said partner apparatus via said relay apparatus;

a response data receiving unit configured to (i) receive, from said relay apparatus, first response data that is a response to the first measurement data, and (ii) receive, from said partner apparatus via said relay apparatus, second response data that is a response to the second measurement data;

a network measurement unit configured to (i) calculate, based on the first response data, a first communication time that is a communication time between said communication apparatus and said relay apparatus, and (ii) calculate, based on the second response data, a second communication time that is a communication time between said communication apparatus and said partner apparatus via said relay apparatus;

a connection mode judging unit configured to judge whether or not said relay apparatus and said partner apparatus are connected through wireless connection, based on a partner section communication time that is a difference between the second communication time and the first communication time; and a connection mode switching unit configured to switch, when said connection mode judging unit judges that said relay apparatus and said partner apparatus are connected through wireless connection, the communication with said partner apparatus from indirect wireless communication to direct wireless communication, indirect wireless communication being wireless communication via said relay apparatus, and the direct wireless communication being wireless communication not via said relay apparatus, wherein said relay apparatus includes:

a data transmitting and receiving unit configured to generate the first response data based on the first measurement data, and to transmit the generated first response data to said communication apparatus; and a data relay unit configured to relay the second measurement data received from said communication apparatus to said partner apparatus, and to relay the second response data received from said partner apparatus to said communication apparatus, wherein said partner apparatus includes a data transmitting and receiving unit configured to generate the second response data based on the second measurement data, and to transmit the generated second response data to said communication apparatus via the relay apparatus, the second measurement data being received from said partner apparatus via the relay apparatus, and wherein said connection mode judging unit is configured to judge that said relay apparatus and said partner apparatus are connected through wireless connection, when the partner section communication time is greater than or equal to a predetermined percentage of the first communication time.

4. A communication method for causing a communication apparatus to switch between connection modes for communication with a partner apparatus, the communication apparatus being connected through wireless connection to a relay apparatus that relays data and communicating with the partner apparatus that is connected to the relay apparatus, said communication method comprising:

transmitting (i) first measurement data to the relay apparatus, and (ii) second measurement data to the partner apparatus via the relay apparatus, the first measurement data being data for measuring a communication time between the communication apparatus and the relay apparatus, and the second measurement data being data for measuring a communication time between the communication apparatus and the partner apparatus via the relay apparatus;

(i) receiving, from the relay apparatus, first response data that is a response to the first measurement data, and (ii) receiving, from the partner apparatus via the relay apparatus, second response data that is a response to the second measurement data;

calculating (i) a first communication time based on the first response data, and (ii) a second communication time based on the second response data, the first communication time being a communication time between the communication apparatus and the relay apparatus, and the second communication time being a communication time between the communication apparatus and the partner apparatus via the relay apparatus;

judging whether or not the relay apparatus and the partner apparatus are connected through wireless connection, based on a partner section communication time that is a difference between the second communication time and the first communication time; and switching, when it is judged in said judging that the relay apparatus and the partner apparatus are connected through wireless connection, the communication with the partner apparatus from indirect wireless communication to direct wireless communication, the indirect wireless communication being wireless communication via the relay apparatus, and the direct wireless communication being wireless communication not via the relay apparatus, wherein said judging comprises judging that the relay apparatus and the partner apparatus are connected through wireless connection, when the partner section communication time is greater than or equal to a predetermined percentage of the first communication time.

5. A non-transitory computer-readable recording medium having a program stored thereon for causing a communication apparatus to switch between connection modes for communication with a partner apparatus, the communication apparatus being connected through wireless connection to a relay apparatus that relays data and communicating with the partner apparatus that is connected to the relay apparatus, the program causing the communication apparatus to execute:

transmitting (i) a first measurement data to the relay apparatus, and (ii) a second measurement data to the partner apparatus via the relay apparatus, the first measurement data being data for measuring a communication time between the communication apparatus and the relay apparatus, and the second measurement data being data for measuring a communication time between the communication apparatus and the partner apparatus via the relay apparatus;

(i) receiving, from the relay apparatus, first response data that is a response to the first measurement data, and (ii) receiving, from the partner apparatus via the relay apparatus, second response data that is a response to the second measurement data;

calculating (i) a first communication time based on the first response data, and (ii) a second communication time based on the second response data, the first communication time being a communication time between the communication apparatus and the relay apparatus, and the second communication time being a communication time between the communication apparatus and the partner apparatus via the relay apparatus;

judging whether or not the relay apparatus and the partner apparatus are connected through wireless connection, based on a partner section communication time that is a difference between the second communication time and the first communication time; and switching, when it is judged in said judging that the relay apparatus and the partner apparatus are connected through wireless connection, the communication with the partner apparatus from indirect wireless communication to direct wireless communication, the indirect wireless communication being wireless communication via the relay apparatus, and the direct wireless communication being wireless communication not via the relay apparatus, wherein said judging comprises judging that the relay apparatus and the partner apparatus are connected through wireless connection, when the partner section communication time is greater than or equal to a predetermined percentage of the first communication time.

6. An integrated circuit for causing a communication apparatus to switch between connection modes for communication with a partner apparatus, the communication apparatus being connected through wireless connection to a relay apparatus that relays data and communicating with the partner apparatus that is connected to the relay apparatus, said integrated circuit comprising:

a measurement data transmitting unit configured to transmit (i) a first measurement data to the relay apparatus, and (ii) a second measurement data to the partner apparatus via the relay apparatus, the first measurement data being data for measuring a communication time between said communication apparatus and the relay apparatus, and the second measurement data being data for measuring a communication time between said communication apparatus and the partner apparatus via the relay apparatus;

a response data receiving unit configured to (i) receive, from the relay apparatus, first response data that is a response to the first measurement data, and (ii) receive, from the partner apparatus via the relay apparatus, second response data that is a response to the second measurement data;

a network measurement unit configured to (i) calculate, based on the first response data, a first communication time that is a communication time between said communication apparatus and the relay apparatus, and (ii) calculate, based on the second response data, a second communication time that is a communication time between said communication apparatus and the partner apparatus via the relay apparatus;

a connection mode judging unit configured to judge whether or not the relay apparatus and the partner apparatus are connected through wireless connection, based on a partner section communication time that is a difference between the second communication time and the first communication time; and a connection mode switching unit configured to switch, when said connection mode judging unit judges that the relay apparatus and the partner apparatus are connected through wireless connection, the communication with the partner apparatus from indirect wireless communication to direct wireless communication, the indirect wireless communication being wireless communication via the relay apparatus, and the direct wireless communication being wireless communication not via the relay apparatus, wherein said connection mode judging unit is configured to judge that the relay apparatus and the partner apparatus are connected through wireless connection, when the partner section communication time is greater than or equal to a predetermined percentage of the first communication time.

* * * * *